US00RE34505E

United States Patent [19]

Whiteman, Jr.

[11] E Patent Number: Re. 34,505

[45] Reissued Date of Patent: Jan. 11, 1994

[54] MOTAR MIXING DRUM

[76] Inventor: Marvin E. Whiteman, Jr., 2254 Braniff St., Boise, Id. 83706

[21] Appl. No.: 757,008

[22] Filed: Sep. 9, 1991

Related U.S. Patent Documents

Reissue of:

[64] Patent No.: 4,877,327
Issued: Oct. 31, 1989
Appl. No.: 315,914
Filed: Feb. 27, 1989

[51] Int. Cl.[5] ..... B28C 5/12; B28C 7/16

[52] U.S. Cl. ..... 366/46; 366/47; 366/64; 366/185; 366/331

[58] Field of Search ..... 366/46, 47, 64, 45, 366/52, 54, 67, 185, 189, 184, 325, 326, 327, 329, 330, 279, 343, 331

[56] References Cited

U.S. PATENT DOCUMENTS

| | | | |
|---|---|---|---|
| 1,460,571 | 7/1923 | Carey | 366/46 |
| 1,621,345 | 3/1927 | Anderson . | |
| 1,705,429 | 3/1929 | Hooydonk . | |
| 1,714,602 | 5/1929 | Jaeger et al. . | |
| 2,453,583 | 11/1948 | Muller | 259/176 |
| 2,482,976 | 9/1949 | Harwood | 259/177 |
| 2,494,118 | 1/1950 | Essick | 259/176 |
| 2,494,119 | 1/1950 | Essick | 259/177 |
| 2,499,052 | 2/1950 | Brookins | 259/176 |
| 2,944,799 | 7/1960 | Larson | 259/177 |
| 2,956,790 | 10/1960 | Moriya | 259/171 |
| 2,970,820 | 2/1961 | Sepich | 366/47 |
| 3,197,180 | 7/1965 | Bates | 259/7 |
| 3,408,774 | 11/1968 | Engel | 366/45 |
| 3,768,785 | 10/1973 | Susemihl | 259/177 R |
| 4,097,926 | 6/1978 | Face | 366/64 |
| 4,268,174 | 5/1981 | Falardeau | 366/46 |
| 4,435,082 | 3/1984 | Bishop | 366/47 |
| 4,491,415 | 1/1985 | Bishop | 366/47 |
| 4,509,860 | 4/1985 | Laser, III | 366/99 |
| 4,521,116 | 6/1985 | Adsit | 366/54 |
| 4,569,648 | 2/1986 | Riederer et al. | 366/54 |
| 4,634,284 | 1/1987 | Bishop | 366/47 |
| 4,711,582 | 12/1987 | Kennedy | 366/279 |
| 4,750,840 | 6/1988 | Bishop | 366/54 |
| 4,756,623 | 7/1988 | Bishop | 366/57 |

FOREIGN PATENT DOCUMENTS

| | | |
|---|---|---|
| 130232 | 6/1947 | Australia . |
| 1236386 | 3/1967 | Fed. Rep. of Germany . |
| 3503896 | 8/1986 | Fed. Rep. of Germany . |
| 196994 | 5/1923 | United Kingdom . |
| 938507 | 10/1963 | United Kingdom . |
| 1085917 | 10/1967 | United Kingdom . |
| 2032793 | 5/1980 | United Kingdom . |
| 2081117 | 2/1982 | United Kingdom . |

OTHER PUBLICATIONS

German Patent No. 943,457; Gebhard; Apparent Date of May 17, 1956.

*Primary Examiner*—Robert W. Jenkins
*Attorney, Agent, or Firm*—Frank J. Dykas; Craig M. Korfanta; Ken J. Pedersen

[57] ABSTRACT

A horizontally oriented mortar mixing drum 11 fabricated of polyethylene material having an elemental cylindrical segment opening through which mortar materials to be mixed may be deposited into or poured from. A perimeter frame having base elemental frame member 15, diametric wall frame members 16 and polyethylene grate 20 is provided for enhancing resistance to torsional stress on drum 11. Wear resistant liner 12 and side panels 13 and 14 cover the interior surface of drum 11. Paddle shaft 18 is rotatably and axially supported within drum 11 and has paddle stubs 28 attached to and extending radially therefrom. Polyethylene mixing paddles 19 are sleeved onto paddle stubs 28 to complete improved mortar mixing drum assembly 10.

42 Claims, 7 Drawing Sheets

MOTAR MIXING DRUM

Matter enclosed in heavy brackets [ ] appears in the original patent but forms no part of this reissue specification; matter printed in italics indicates the additions made by reissue.

BACKGROUND OF THE INVENTION

1. Technical Field

This invention generally relates to an improved mortar mixing drum, and in particular to a mortar mixing drum fabricated from polyethylene crosslink with a removable wear resistant plastic liner and paddles, and an elemental perimeter drum frame for rigidity.

2. Background Art

Present day mortar mixers are constructed of all steel. Typically, they have a cylindrically shaped drum open along the top side and a plurality of metal mixing paddles and wipers axially and rotatably secured within the drum. A rotation means, such as a gasoline engine, is provided to rotate a paddle axle to facilitate mixing the mortar. The ends of the paddles are provided with rubber wipers which contact the metal interior surface of the drum. This is necessary because the mortar sticks to the inside of the drum, as it also sticks to the paddles. It should be obvious that the life span of the rubber wipers is limited and they require frequent replacement.

Often, due to improper maintenance and cleaning, residual mortar is allowed to dry within the mixing drum and other surfaces, including the paddles. Because dried mortar is very difficult to remove from a metal surface, workers often resort to breaking the mortar loose with a hammer or other heavy object. Consequently, mortar mixers typically spend a great deal of time in the shop for repairs.

A similar problem exists in the analogous art of cement mixers. Attempts have been made to solve this problem, such as Bishop's U.S. Pat. Nos. 4,435,082, 4,491,415, and 4,756,623, which all teach rotatable cement mixing drums manufactured of a plastic such as polyethylene. Adsit, U.S. Pat. No. 4,521,116, teaches a mixing apparatus having a removable and disposable synthetic resin drum liner. Kennedy, U.S. Pat. No. 4,711,582 teaches a rotary mixing device which uses a bag as a disposable drum liner. Riederer, U.S. Pat. No. 4,569,648 teaches a self-cleaning rotating drum being lined with elastic webs.

None of the above described devices are capable of mixing mortar, as they are designed for mixing cement. There is a significant difference between compositions of mortar and those of cement. Typically cement contains larger gravel particles as compared to mortar whose largest component is relatively small grained lime cement and sand. There may be a substantial difference in weight, with standard cement gravel mixtures weighing approximately 150 pounds per cubic foot, whereas mortar will typically weigh approximately 200 pounds per cubic foot. As a result the polyethylene drums taught by Bishop's U.S. Patents and the rest of the cement mixers taught by the above-described prior art are not suitable for mixing mortar.

To date the most effective apparatus for mixing mortar uses a cylindrical drum having a cylindrical segment opening along the longitudinal, or elemental, length of the drum and a plurality of paddles rotatably secured within the drum. The ends of the paddles are provided with rubber wipers which wipe the inner surface of the cylindrical drum, keeping it free of adhering mortar. Contrary to their cement mixing counterparts, mortar mixers are not easily operated by hand, primarily because of the added density of the material being mixed, and must use either gasoline or electric motor to operate the mixing paddles.

The drum itself is rotatable from an orientation where the elemental segment opening is at the top to a dumping position where the opening is rotated downward until mortar is free to spill from the drum. Since the drum contains rotating paddles it presents a safety hazard, and the typical mortar mixer design includes protective grates covering the opening. Typically there are two sections to the protective grate, the first being fixed and the second hinged to open when mortar is being dumped from the drum. The grates are normally made of steel and have sufficient opening size to allow water and dry mortar to be easily dumped into the drum, yet small enough to keep operators' hands and clothing from being caught by the rotating mixing paddles.

Two problems plague both the manufacturers and users of such mortar mixers, the first is the abrasion caused by mortar being wiped against the inside walls of the mixing drum which will eventually cause the drum to wear through. The second is that mixed mortar will adhere to grates even during proper operation and must be chiseled off, and on occasion, mortar will be allowed to dry on the inside of the drum and the paddles to which it readily adheres. The only effective means of removing dried mortar from the inside of the drum and off the grates and paddles is to break it loose with a hammer or other heavy object. This is a time consuming chore and can easily result in damaged paddles and dents in the drum which interfere with the contoured surface of the drum and, if severe enough, will interfere with the rotation of the mixing paddles causing the paddle assembly to jam inside the drum. In practice it has been found that when a mortar mixer is being used on a full-time basis, the all steel drum should be replaced every three to six months. This of course is time consuming and expensive.

The use of plastic drums would be preferable since plastic such as polyethylene crosslink present a surface to which dried mortar will not adhere. The problems with the use of polyethylene crosslink are twofold, the first is wear on the inside of the drum caused by the abrasion of mortar being mixed, and the second is the considerable weight and high viscosity of mortar. The typical mortar mixer is designed to mix between six and eight cubic feet of mortar at a time. This can [weight] *weigh* between 800 to 1,600 pounds.

The abrasiveness and high viscosity of mortar results in torque moments being imparted to the drum when the paddles are being rotated to mix mortar. These forces imparted can be considerable and can result in net torsional forces being imparted to the drum as a result of the means by which the drum is held in its upright or mixing position. These forces are the primary reason why steel has been the material of choice for fabricating mortar mixing drums.

As a result plastic mortar mixing drums had to be fabricated of thick, and relatively heavy, plastic materials.

What is needed is a plastic mortar mixing drum which has the combination of the non-adhering surfaces for the drum, the paddles and the grates, the structural strength and integrity of a steel drum, and an improved wear surface. The fabrication of such a drum would substantially increase its useful life and decrease the maintenance expenses incurred in removing dried mortar from the mixer parts and for periodically replacing mixing drums and paddles.

DISCLOSURE OF INVENTION

These objects are accomplished by use of an improved mortar mixing drum which is generally cylindrical and molded from a polyethylene material. The drum has an elemental cylindrical segment opening through which material to be mixed may be deposited into or poured from the drum. An elemental perimeter frame member is provided and positioned in elemental contact with the cylindrical drum opposite the elemental segment opening and serves as the base for a perimeter frame. It is attached to a pair of diametric end wall frame members each in diametric external contact with an end wall of the cylindrical drum. An elemental polyethylene grate opening member spans a portion of the elemental segment opening and completes a perimeter frame by being attached at its ends to the corresponding ends of the diametric end wall frame members.

A liner of ultra high molecular weight polyethylene material is attached to and covers the interior surfaces of the drum.

A paddle shaft coaxially aligned with the cylindrical axis of the mortar mixing drum is provided. Extending radially out from the paddle shaft are a plurality of paddle stubs to which are attached polyethylene paddles. The polyethylene paddles are integrally molded units having hollow rectangular sleeves which slide over and are attached to the radial rectangular paddle stubs by means of through hole bolts.

BEST MODE FOR CARRYING OUT INVENTION

Figure 1:
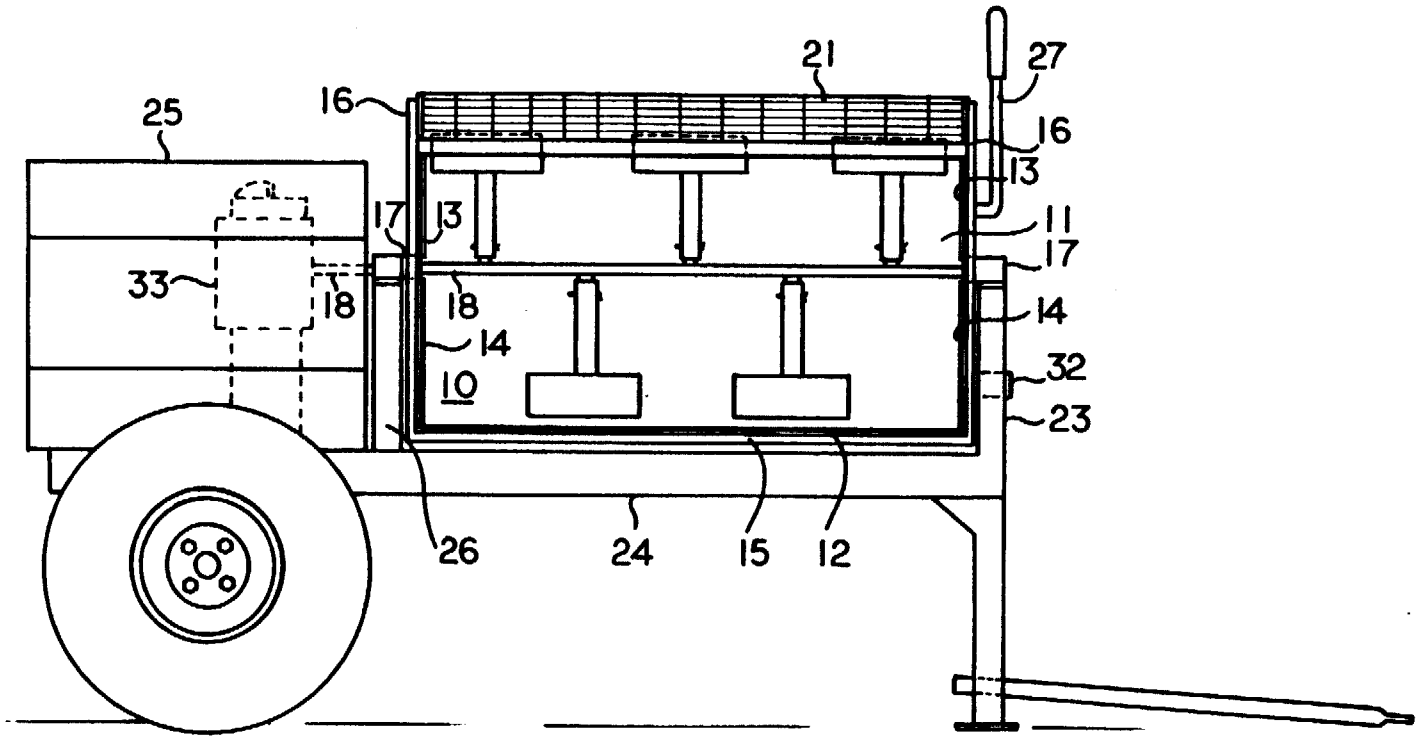
FIG. 1 is a side view of a mortar mixer.
Figure 2:
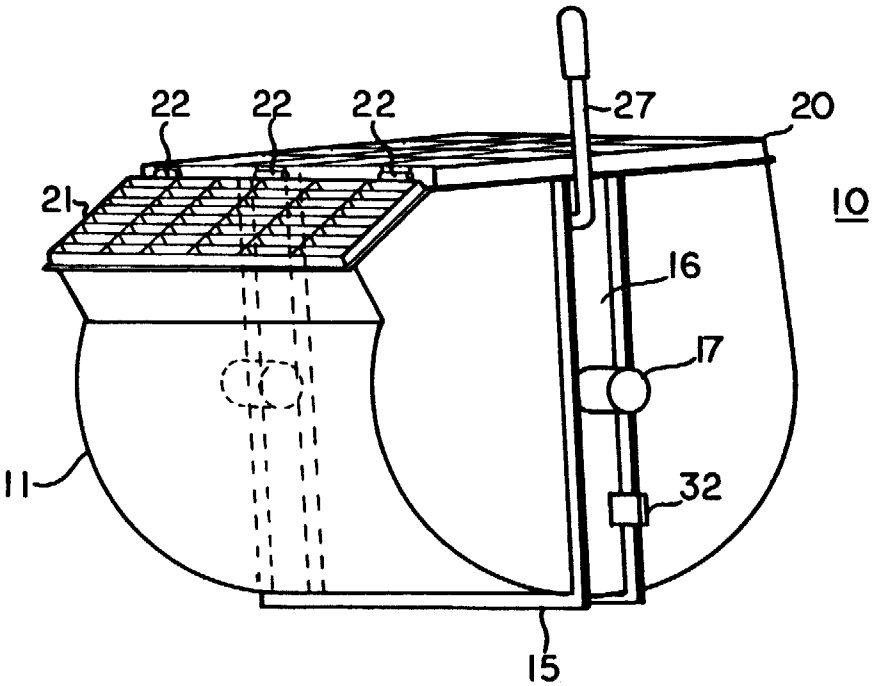
FIG. 2 is a perspective representational view of the improved mortar mixing drum.
Figure 5:
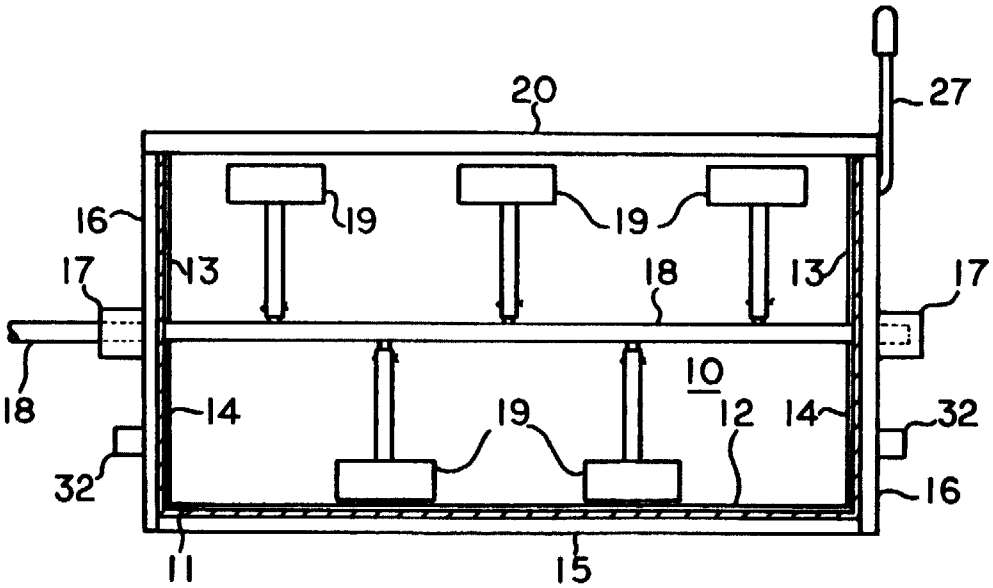
FIG. 5 is a sectional side view of the mortar mixing drum.

As shown in FIGS. 1, 2 and 5, drum assembly 10 is supported by drum shaft assemblies 17 for rotational motion between front frame strut 23 and rear frame strut 26 which extend up from mortar mixer trailer frame 24. Drum shaft assemblies 17 function in a dual rotational capacity in that they permit the rotation of the drum from an upright or mixing position wherein polyethylene plastic grate frame member 20 and dumping rate 21, which span and cover an elemental cylindrical segment opening in drum 11 are positioned atop the horizontally oriented drum assembly 10 to a dumping position where mixed mortar will spill out onto a mortar board or wheelbarrow, neither shown, through an opening between drum 11 and dumping grate 21 created when plastic dumping grate 21, which is hingedly connected to plastic grate frame member 20 by hinges 22, swings away from drum 11.

Figure 6:
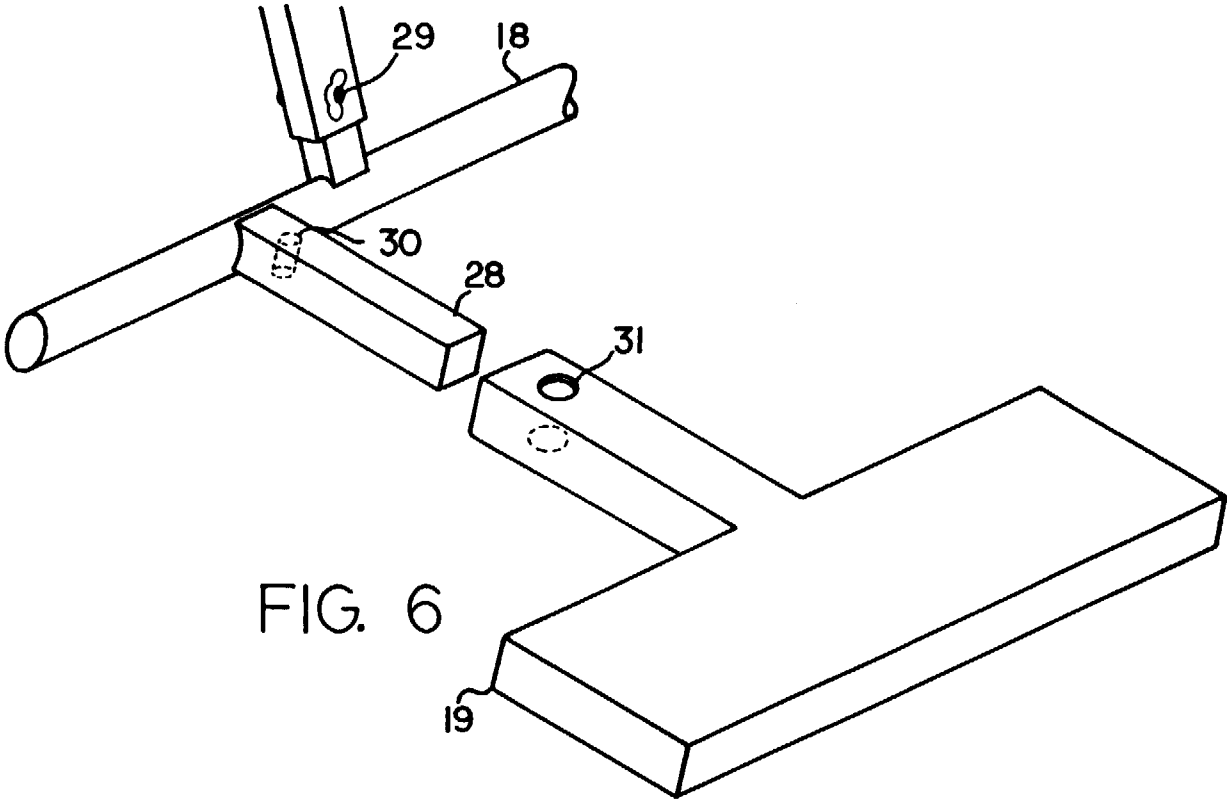
FIG. 6 is a representational perspective view of the paddle stub and paddle assembly.

A second rotational function served by drum shaft assembly 17 is to support, for rotation, paddle shaft 18 which in turn supports a plurality of paddle assemblies 19 which are sleeved onto paddle stubs 28 which extend radially out from paddle [end] *shaft* 18 as shown in FIGS. 5 and 6. Paddle assemblies 19, as shown in FIG. 6, are attached to paddle stubs 28 by means of through lock bolts 29 inserted through aligned paddle stub bolt holes 30 and paddle assembly bolt holes 31. Since mortar mixers are used at remote construction sites, the entire assembly is mounted on trailer frame 24, and is provided with a gasoline engine 33, inside cowling assembly 25. Engine 33 is used to rotate paddle shaft 18. Rotation of drum assembly 10 from the mixing position to the dumping position is accomplished manually by an operator grasping drum handle 27 and pulling the same downward to rotate drum assembly 10.

Figure 3:
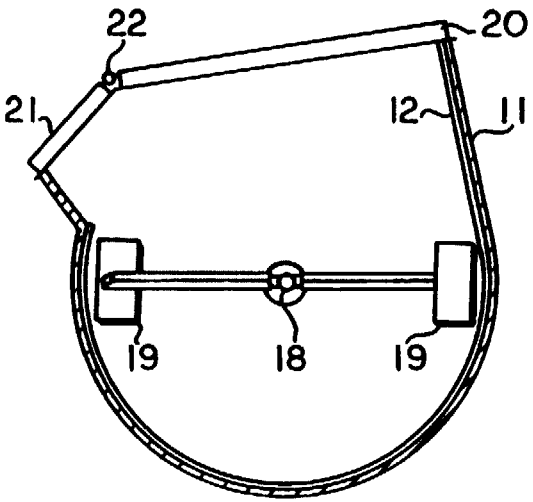
FIG. 3 is a sectional end view of the mortar mixing drum.

In the preferred embodiment, as shown in FIGS. 2, 3 and 5, drum 11 is fabricated of polyethylene crosslink material or other suitable plastic composition capable of holding between six cubic feet to eight cubic feet of mortar. Mortar is substantially heavier than cement aggregate compositions, and as a result the total weight of mortar mixed at any one time will weigh between 800 to 1,600 pounds. In practice it has been found that a polyethylene crosslink drum can be easily fabricated to withstand such weight in and of itself.

Figure 7:
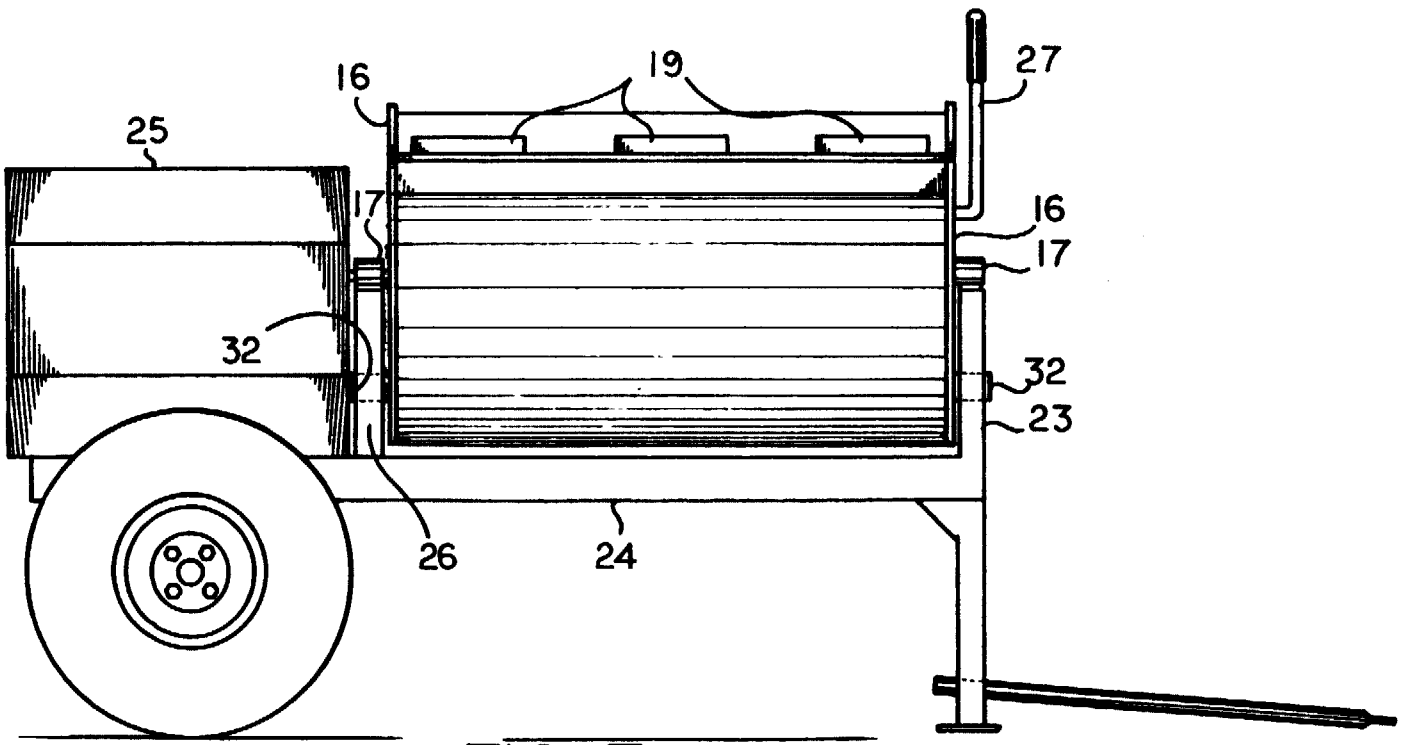
*FIG. 7 is a side view of a second embodiment of the mortar mixer.*

But, in addition to the weight of the mortar itself, there are two additional forces which must be considered. The first is the torque moments about the axis of the drum induced by the rotating paddle assemblies being rotated through the highly [viscose] *viscous* mortar mixture which, if unchecked, would also cause or induce rotation of the drum in the same direction as the paddle shaft assembly. This type of rotation is prevented by means of a cam stop 32 as shown in FIGS. 1, 2 and 5, which engages front frame strut 23 to prevent this rotation. This is the point at which all of the countering forces which counter this induced torque moment are applied to the drum assembly 10, and results in a torsional stressing of drum 11 between rear frame strut 26 and front frame strut 23. Even if additional cam stops were provided for rear frame strut 26, there would still *be* significant torsional stresses imparted to drum 11. *This particular embodiment is shown in FIG. 7, where an elemental perimeter frame is here defined by a pair of diametric frame members 16 and trailer frame 24. Diametric frame members 16 are coupled with trailer frame 24 through front and rear cam stops 32 on trailer frame 24 to complete a three sided perimeter frame. While this particular embodiment is not the preferred embodiment, it will work for the purposes of the present invention.*

As a result it has been found that the construction of an elemental perimeter frame around the cylindrical drum 11 provides adequate reinforcement for the polyethylene crosslink drum 11 to the extent that thickness of drum 11 can be reduced and drum distortion resulting from the torque moment and resulting torsional stresses are eliminated. The perimeter frame is comprised of a metal elemental perimeter frame member 15 which runs the length from one end of drum 11 to the other and is positioned opposite the elemental cylindrical segment opening in drum 11. Elemental frame member 15 provides a base for supporting drum 11 and its contents which may weigh between 800 and 1,600 pounds.

Metal diametric frame members 16 are attached to each of the end walls of drum 11 and extend upward from elemental frame member 15 through the central axis of the drum assembly and serve as a convenient attachment point for drum shaft assemblies 17.

In the preferred embodiment the perimeter frame assembly is completed by the addition of polyethylene crosslink grate frame member 20 which also connects to diametric frame members 16 to complete the perimeter frame. Grates 20 and 21 are necessary to prevent operators from inserting their hands, shovels or other tools into drum 11 when paddle shaft 18 and its attached paddles 19 are being rotated. Without grate frame member 20 and dumping grate 21, there would be a substantial risk of harm to the operator and the mortar mixer.

Figure 4:
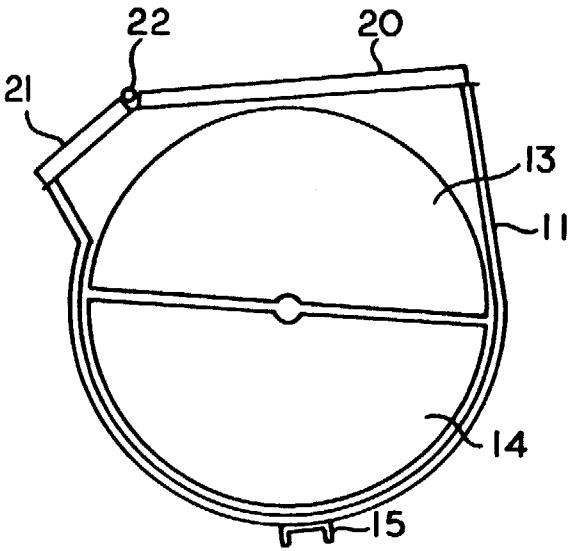
FIG. 4 is a representational side view of the interior surface of an end wall of the mortar mixing drum.

It should be apparent that mortar is an abrasive substance and would wear the surfaces of drum 11. As a result a wear resistant plastic liner 12 is provided to line the inner cylindrical surface of drum 11. In the preferred embodiment the wear resistant plastic is fabricated of ultra high molecular density polyethylene which is a material that cannot be rotomolded but instead can only be made in extruded sheets. As a result a generally rectangular, but flexible, panel 12 is then inserted into the interior cylindrical section of drum assembly 10. In practice it has been found that it can be bolted (not shown) or glued to drum 11 so as to facilitate removal and replacement as necessary. FIG. 4 shows two side panels 13 and 14, also extruded of ultra high molecular density polyethylene, a pair of which are bolted to each of the end walls of drum 11 to complete a wear resistant surface inside of drum 11.

While there is shown and described the present preferred embodiment of the invention, it is to be distinctly understood that this invention is not limited thereto but may be variously embodied to practice within the scope of the following claims.

What is claimed is:

1. In an improved mortar mixer having a generally horizontally oriented cylindrical mortar drum with generally vertical and circular end walls, and paddle means rotatably and axially secured therein, and paddle rotation means, wherein the improvement comprises:

said drum being molded from a polyethylene material, said drum further having an elemental cylindrical segment opening through which material to be mixed may be deposited into or poured from said drum;

an elemental perimeter frame member positioned in elemental, external, contact with said cylindrical drum opposite the elemental segment opening; and a pair of diametric end wall frame members each in diametric external contact with an end wall and attached to the corresponding end of the elemental perimeter frame.

2. The improved mortar mixer of claim 1, wherein the paddle means further comprises:

a paddle shaft rotatably and axially secured within said drum, and attached for rotation to said paddle rotation means;

a plurality of paddle stubs attached to and radially extending from said paddle shaft; and a plurality of rectangular mixing paddles fabricated of polyethylene crosslink each attached to a paddle stub.

3. The improved mortar mixer of claim 2 which further comprises a hollow sleeve attached to and extending from said rectangular paddle for sleeved engagement with a paddle stub.

4. The improved mortar mixer of claim No. 2 which further comprises a liner of wear resistant, ultra high molecular weight polyethylene, attached to and covering the interior surfaces of said drum.

5. The improved mortar mixer of claim No. 4 wherein said wear resistant liner is removably attached to and covering the interior surfaces of said drum.

6. The improved mortar mixer of claim 1 which further comprises an elemental grating member spanning a portion of the elemental segment opening and attached at each end of the diametric end wall frame member.

7. The improved mortar mixer of claim 6 wherein said elemental grating member is fabricated of polyethylene.

8. The improved mortar mixer of claim No. 7, wherein the paddle means further comprises:

a paddle shaft rotatably and axially secured within said drum, and attached for rotation to said paddle rotation means;

a plurality of paddle stubs attached to and radially extending from said paddle shaft; and a plurality of rectangular mixing paddles fabricated of polyethylene crosslink each attached to a paddle stub.

9. The improved mortar mixer of claim 8 which further comprises a hollow sleeve attached to and extending from said rectangular paddle for sleeved engagement with a paddle stub.

10. The improved mortar mixer of claim 6 which further comprises a liner of wear resistant, ultra high molecular weight polyethylene, attached to and covering the interior surfaces of said drum.

11. The improved mortar mixer of claim 10 wherein said wear resistant liner is removably attached to and covering the interior surfaces of said drum.

12. The improved mortar mixer of claim 1 which further comprises a liner of wear resistant, ultra high molecular weight polyethylene, attached to and covering the interior surfaces of said drum.

13. The improved mortar mixer of claim No. 12 wherein said wear resistant liner is removably attached to and covering the interior surfaces of said drum.

14. In an improved mortar mixer having a generally horizontally oriented cylindrical mortar drum with generally vertical and circular end walls, and paddle means rotatably and axially secured within the drum, and paddle rotation means, wherein the improvement comprises:

said drum being molded from a polyethylene material, said drum further having an elemental cylindrical segment opening through which material to be mixed may be deposited into or poured from the drum;

a liner of wear resistant, ultra high molecular weight polyethylene plastic, attached to and covering the interior surfaces of said drum.

15. The improved mortar mixer of claim 14 wherein said wear resistant liner is removably attached to and covering the interior surfaces of said drum.

16. An improved mortar mixer having a generally horizontally oriented cylindrical mortar drum with generally vertical and circular end walls, and paddle rotation means, an improvement which comprises:

a paddle shaft rotatably and axially secured within said drum, and attached for rotation to said paddle rotation means;

a plurality of paddle stubs attached to and radially extending from said paddle shaft; and a plurality of rectangular mixing paddles fabricated of polyethylene crosslink each attached to a paddle stub.

17. The improved mortar mixer of claim 16 wherein said paddles further comprise:

a rectangular paddle for mixing mortar; and a hollow sleeve attached to and extending from said rectangular paddle for sleeved engagement with a paddle stub.

*18. An improved mortar mixer having a generally horizontally oriented cylindrical mortar drum with generally vertical and circular end walls, and paddle means rotatably and axially secured therein, and paddle rotation means, carried by a mortar mixer trailer frame wherein the improvement comprises:*

*said drum being molded from a polyethylene material, said drum further having an opening through which material to be mixed may be deposited into or poured from said drum;*

*perimeter frame means having three elements, including a pair of diametric end wall frame members and a third element being connected therebetween, spanning the length of said drum, for counteracting the torsional moments created by mixing mortar.*

*19. The improved mortar mixer of claim 18 wherein the third element of the perimeter frame means comprises an elemental frame member being attached to said drum generally opposite the drum opening and to each end wall frame member.*

*20. The improved mortar mixer of claim 18 wherein the third element of the perimeter frame means comprises a grate member being attached between said drum end walls and to each end wall frame member.*

*21. The improved mortar mixer of claim 20 further comprising stop means interacting with said drum to counteract torsional forces created by mixing mortar.*

*22. An improved mortar mixer having a generally horizontally oriented cylindrical mortar drum with generally vertical and circular end walls, and paddle means rotatably and axially secured therein, and paddle rotation means, carried by a mortar mixer trailer frame wherein the improvement comprises:*

*said drum being molded from a polyethylene material, said drum further having an opening through which material to be mixed may be deposited into or poured from said drum;*

*perimeter frame means having three elements, including a pair of diametric end wall frame members and a third element spanning the length of said drum, for counteracting the torsional moments created by mixing mortar, wherein the third element of the perimeter frame is defined by the mortar mixer trailer frame and a pair of cam stops disposed thereon which couple with the diametric end wall frame members and thereby resist torsional stress imparted to the drum by mixing mortar.*

*23. An improved mortar mixer having a generally horizontally oriented cylindrical mortar drum with generally vertical end walls, and paddle means rotatably and axially secured therein, and paddle rotation means, carried by a mortar mixer trailer frame wherein the improvement comprises:*

*said drum being molded from a polyethylene material, said drum further having an opening through which material to be mixed may be deposited into or poured from said drum; and*

*a diametric end wall reinforcing supporting frame member secured to each of the generally vertical end walls, each end wall reinforcing supporting frame member being fabricated of a material which is different from the polyethylene material of said drum.*

*24. The improved mortar mixer of claim 23 wherein the different frame member material is metal.*

*25. The improved mortar mixer of claim 23 wherein each of the diametric end wall reinforcing supporting frame members includes a drum shaft bearing assembly through which a paddle rotation shaft is received.*

*26. The improved mortar mixer of claim 23 further comprising stop means interacting with the drum and trailer frame for restricting rotation of the drum when the paddle means is being rotatably driven by the paddle rotation means.*

*27. The improved mortar mixer of claim 23 further comprising a cam stop engaging between the trailer frame and at least one of the end wall reinforcing supporting frame members to restrict rotation of the drum upon actuation of the paddle rotation means.*

*28. The improved mortar mixer of claim 23 further comprising a cam stop connected to at least one of the end wall reinforcing supporting frame members, the cam stop being positioned to engage with the trailer frame to restrict rotation of the drum upon actuation of the paddle rotation means.*

*29. The improved mortar mixer of claim 23 wherein the diametric end wall reinforcing members are secured externally of the drum to the drum end walls.*

*30. The improved mortar mixer of claim 23 wherein the diametric end wall reinforcing members are longitudinally elongated.*

*31. The improved mortar mixer of claim 23 wherein the generally cylindrical mortar drum has a height when said opening is positioned generally upward with the drum being positioned in a mixing position, the diametric reinforcing frame members having longitudinal lengths which are substantially equal to the height and extending longitudinally therealong.*

*32. The improved mortar mixer of claim 23 further comprising a gate frame member which covers the opening, the gate frame member connecting with each of the diametric end wall reinforcing members.*

*33. The improved mortar mixer of claim 23 wherein the different frame member material is metal, the mortar mixer further comprising a cam stop engaging between the trailer frame and at least one of the end wall reinforcing supporting frame members to restrict rotation of the drum upon actuation of the paddle rotation means.*

*34. The improved mortar mixer of claim 23 wherein the different frame member material is metal, the mortar mixer further comprising a cam stop connected to at least one of the end wall reinforcing supporting frame members, the cam stop being positioned to engage with the trailer frame to restrict rotation of the drum upon actuation of the paddle rotation means.*

*35. The improved mortar mixer of claim 23 wherein the different frame member material is metal, and the diametric end wall reinforcing members are secured externally of the drum to the drum end walls.*

*36. The improved mortar mixer of claim 23 wherein the different frame member material is metal, and the diametric end wall reinforcing members are longitudinally elongated.*

*37. The improved mortar mixer of claim 23 wherein the different frame member material is metal, the generally cylindrical mortar drum has a height when said opening is positioned generally upward with the drum being positioned in a mixing position, the diametric reinforcing*

*frame members having longitudinal lengths which are substantially equal to the height and extending longitudinally therealong.*

*38. The improved mortar mixer of claim 23 wherein the diametric end wall reinforcing members are longitudinally elongated, and each of the diametric end wall reinforcing supporting frame members includes a drum shaft bearing assembly through which a paddle rotation shaft is received.*

*39. The improved mortar mixed of claim 23 wherein the generally cylindrical mortar drum has a height when said opening is positioned generally upward with the drum being positioned in a mixing position, the diametric reinforcing frame members having longitudinal lengths which are substantially equal to the height and extending longitudinally therealong, and the different frame member material is metal.*

*40. The improved mortar mixer of claim 23 wherein the different frame member material is metal, the diametric end wall reinforcing members being secured externally of the drum to the drum end walls, and the mortar mixer further comprising a cam stop engaging between the trailer frame and at least one of the end wall reinforcing supporting frame members to restrict rotation of the drum upon actuation of the paddle rotation means, the diametric end wall reinforcing members are secured externally of the drum to the drum end walls.*

*41. An improved mortar mixer having a generally horizontally oriented cylindrical mortar drum with generally vertical end walls, and the paddle means rotatably and axially secured therein, and paddle rotation means, carried by a mortar mixer trailer frame wherein the improvement comprises:*

*said drum being molded from a polyethylene material, said drum further having an opening through which material to be mixed may be deposited into or poured from said drum, the generally cylindrical mortar drum having a height when said opening is positioned generally upward with the drum being positioned in a mixing position;*

*a diametric end wall reinforcing supporting frame member secured externally to each of the generally vertical end walls, each end wall reinforcing supporting frame member being fabricated of metal, each supporting frame member being longitudinally elongated and having longitudinal lengths which are substantially equal to the drum height and extending longitudinally therealong, each diametric end wall reinforcing supporting frame member including a drum shaft bearing assembly through which a paddle rotation shaft is received; and*

*a cam stop engaging between the trailer frame and at least one of the end wall reinforcing supporting frame members to restrict rotation of the drum upon actuation of the paddle rotation means.*

*42. The improved mortar mixer of claim 41 wherein the cam stop is connected to one of the end wall reinforcing supporting frame members.*

* * * * *

UNITED STATES PATENT AND TRADEMARK OFFICE

CERTIFICATE OF CORRECTION

PATENT NO. : Re. 34,505

DATED : January 11, 1994

INVENTOR(S) : Marvin E. Whiteman, Jr.

It is certified that error appears in the above-indentified patent and that said Letters Patent is hereby corrected as shown below:

On the title page, item [54] and column 1, line 2, change "Motar" to --Mortar--.

Signed and Sealed this

Eleventh Day of October, 1994

*Attest:*

*Attesting Officer*

BRUCE LEHMAN

*Commissioner of Patents and Trademarks*